US012577052B2

(12) United States Patent
Gao

(10) Patent No.: US 12,577,052 B2
(45) Date of Patent: Mar. 17, 2026

(54) CERAMIC ABLATION-RESISTANT CONVEYOR BELT AND PREPARATION METHOD THEREOF

(71) Applicant: HEBEI HAODE RUBBER & PLASTICS CO., LTD., Hengshui City (CN)

(72) Inventor: Fenghao Gao, Hengshui City (CN)

(73) Assignee: HEBEI HAODE RUBBER & PLASTICS CO., LTD., Hengshui City (CN)

( * ) Notice: Subject to any disclaimer, the term of this patent is extended or adjusted under 35 U.S.C. 154(b) by 183 days.

(21) Appl. No.: 18/396,287

(22) Filed: Dec. 26, 2023

(65) Prior Publication Data

US 2025/0074707 A1     Mar. 6, 2025

(30) Foreign Application Priority Data

Sep. 4, 2023     (CN) .......................... 202311132865.9

(51) Int. Cl.
B65G 15/34          (2006.01)

(52) U.S. Cl.
CPC .................................... B65G 15/34 (2013.01)

(58) Field of Classification Search
None
See application file for complete search history.

(56) References Cited

U.S. PATENT DOCUMENTS 5,590,500 A * 1/1997 McCue ................... E04F 13/08
52/509

FOREIGN PATENT DOCUMENTS

| BR | 0100706 A | | 9/2002 |
| CN | 200978133 Y | | 11/2007 |
| CN | 205906565 U | | 1/2017 |
| CN | 207844263 U | | 9/2018 |
| CN | 209925482 U | | 1/2020 |
| CN | 210504272 U | * | 5/2020 |
| CN | 210913988 U | | 7/2020 |
| CN | 215853410 U | | 2/2022 |
| JP | S62-96211 A | | 5/1987 |
| JP | H08-268520 A | | 10/1996 |

OTHER PUBLICATIONS

CN Office Action dated Dec. 15, 2023 as received in Application No. 202311132865.9.

* cited by examiner

*Primary Examiner* — Kavel Singh
(74) *Attorney, Agent, or Firm* — Maschoff Brennan

(57)          ABSTRACT

A ceramic ablation-resistant conveyor belt includes a core layer and a vulcanized layer. A ceramic sheet is embedded inside a frame and embedded on the vulcanized layer of the conveyor belt body together with the frame, and is directly connected to a skeleton. The vulcanized layer is exposed on an upper surface of the ceramic sheet. The ceramic sheet is embedded in the frame, which is embedded in the vulcanized layer, which is directly connected to the skeleton to make it stronger. The frame is fixed through the vulcanized layer, and the ceramic sheets are fixed through the frame, which is more solid compared with ceramic sheets connected only by bonding. The conveyor belt is more stable, and the ceramic sheet is less likely to fall off during long-term use. If it falls or is damaged, it can be easily replaced, thereby improving its service life.

16 Claims, 2 Drawing Sheets

CERAMIC ABLATION-RESISTANT CONVEYOR BELT AND PREPARATION METHOD THEREOF

TECHNICAL FIELD

This invention relates to the technical field of conveyor belts, and in particular to a ceramic ablation-resistant conveyor belt and a preparation method thereof.

BACKGROUND

After providing ceramic sheets on the conveyor belt, when high-temperature products are conveyed, the ceramic sheets are in direct contact with the products to be conveyed, so that the microporosity of the ceramic sheets can be used to isolate most of the heat, thereby improving the ablation-resistant performance of the conveyor belt.

For example, a ceramic sheet heat-resistant conveyor belt is disclosed in Chinese patent document CN210913988U, wherein a rubber coating layer is provided on the heat-resistant layer of the conveyor belt, and a ceramic sheet is provided on the rubber coating layer, so that the ceramic sheet can be utilized to isolate most of the heat, thereby improving the heat-resistant property of the conveyor belt.

However, in prior art solutions, ceramic sheets are generally connected to the conveyor belt only by bonding. After being used for a period of time, the ceramic sheets are prone to fall off, resulting in a shorter service life of the conveyor belt.

SUMMARY OF THE INVENTION

Therefore, the technical problem to be solved by the present invention is to overcome the defect that the ceramic sheets in the ceramic ablation-resistant conveyor belt of the prior art are easy to fall off, thereby providing a ceramic ablation-resistant conveyor belt that can improve the stability of the ceramic sheets and its preparation method.

In order to solve the above technical problem, the present invention provides a ceramic ablation-resistant conveyor belt, comprising:

a conveyor belt body having a core layer and a vulcanized layer;

a ceramic sheet embedded inside a frame and embedded on the vulcanized layer of the conveyor belt body together with the frame, wherein the vulcanized layer is exposed on an upper surface of the ceramic sheet.

Optionally, the frame has a hook part extending downward.

Optionally, the hook part is inserted into the core layer.

Optionally, the hook part has a barb on a portion of the hook part inserted into the core layer.

Optionally, the hook part has a hooking direction towards a conveying direction of the conveyor belt body.

Optionally, the frame is an elastic steel frame.

Optionally, the frame is formed by mould pressing.

Optionally, the frame has a slit for flowing into rubber material.

Optionally, an inner wall of a recessed structure of the frame for accommodating the ceramic sheet is a curved inner wall.

Optionally, the frame has an elastic layer between the inner wall of the recessed structure of the frame for accommodating the ceramic sheet and the ceramic sheet.

Optionally, the ceramic sheet has a plurality of blocks provided in array on a surface of the conveyor belt body.

The present invention also provides a method for preparing a ceramic ablation-resistant conveyor belt according to any one of the above solutions, which comprises the following steps:

forming a core layer;

laying a vulcanized layer on the core layer;

embedding a ceramic sheet inside a frame and placing the embedded frame on the vulcanized layer;

vulcanizing the vulcanized layer by a vulcanization process, and embedding the ceramic film in the vulcanized vulcanized layer together with the frame.

The technical solution of the present invention has the following advantages:

1. In the ceramic ablation-resistant conveyor belt provided by the present invention, the ceramic sheets are embedded in a frame and the frame is embedded in a vulcanized layer of the conveyor belt body, the frame is fixed through the vulcanized layer, and the ceramic sheets are fixed through the frame. Compared with the ceramic sheets connected only by bonding in prior art, the ceramic sheets in the ablation-resistant conveyor belt provided by the present invention are more stable, and are not prone to fall off during long-term use, thereby improving the service life of the conveyor belt. The most important feature of this product is that it can be replaced in time if it breaks away or is damaged.

2. The ceramic ablation-resistant conveyor belt provided by the present invention is provided with a hook part on the frame, and the hook part extends further into the vulcanized layer, thereby further improving the stability of the frame in the vulcanized layer. In addition, the direction of the hook part is provided towards a conveying direction of the conveyor belt body. In this way, when the product to be conveyed is placed on the conveyor belt, the product to be conveyed is in direct contact with the ceramic sheet. At this time, due to the inertia of the product to be conveyed, the ceramic sheet needs to bear the friction force because of shock and weight of the product to be conveyed to the conveying direction of the conveyor belt. The present invention, by arranging the hook part of the frame toward the conveying direction of the conveyor belt body, can further ensure that the frame is firmly connected with the conveyor belt body, and when the products to be conveyed are placed on the conveyor belt body, it can better withstand the friction caused by its inertia, and ensure that the ceramic sheet is firmly connected.

3. The method for preparing the ceramic ablation-resistant conveyor belt provided by the present invention is to lay a vulcanized layer on the core layer of the belt and lay a frame embedded with ceramic sheet on the vulcanized layer at the same time, and the frame is embedded in the vulcanized layer by using the vulcanization for the vulcanized layer. The above method can ensure that, the frame is fixed in the vulcanized layer, and during use, the extrusion of the vulcanized layer together with the clamping of the frame, can further ensure the installation stability of the ceramic sheet. Compared with the adhesive connection method in the prior art, the preparation method provided by the present invention can more firmly connect the frame to the conveyor belt body, and make the ceramic sheets less likely to fall off on the conveyor belt body.

BRIEF DESCRIPTION OF THE DRAWINGS

In order to explain specific embodiments of the present invention or technical solutions in the prior art more clearly, accompanying drawings used in the description of the specific embodiments or the prior art will be briefly introduced below. Obviously, the accompanying drawings in the following description are some embodiments of the present invention, for those ordinarily skilled in the art, other accompanying drawings may further be obtained according to these accompanying drawings without any creative labor.

DESCRIPTION OF REFERENCE SIGNS

1—conveyor belt body; 2—frame; 3—ceramic sheet; 4—hook part; 5—slit; 6—curved inner wall; 7—vulcanized layer; 8—core layer; 9—barb.

DETAILED DESCRIPTION

The technical solutions of the present invention will be described clearly and completely in conjunction with the accompanying drawings. Obviously, the described examples are part of the examples of the present invention, not all of them. Based on the examples of the present invention, all other examples obtained by those ordinarily skilled in the art without creative efforts shall fall within the protection scope of the present invention.

In the description of the present application, it should be noted that directional or positional relationships indicated by terms such as "center", "upper", "lower", "left", "right", "vertical", "horizontal", "inner", "outer" are based on directional or positional relationships as shown in the accompanying drawings, and are only for purposes of facilitating describing the present invention and simplifying the description, rather than indicating or implying that the referred apparatus or element has to have a specific direction or be constructed and operated in the specific direction, and therefore, they cannot be regarded as limitations on the present invention.

In description of the present invention, it should be noted that the terms "mounted", "connected" and "connection" should be understood in a broad sense unless otherwise specified and defined, for example, "connection" may be a fixed connection or a detachable connection or an integrated connection, may be a direct connection or an indirect connection through an intermediate medium, and may be internal connection of two elements. For those ordinarily skilled in the art, the specific meanings of the above terms in the present invention may be understood according to specific situations.

In addition, the technical features involved in different embodiments of the present invention described below may be combined with each other as long as they do not conflict with each other.

The ceramic ablation-resistant conveyor belt provided in this embodiment can be used for conveying high-temperature products, such as high-temperature steel materials.

Figure 1:
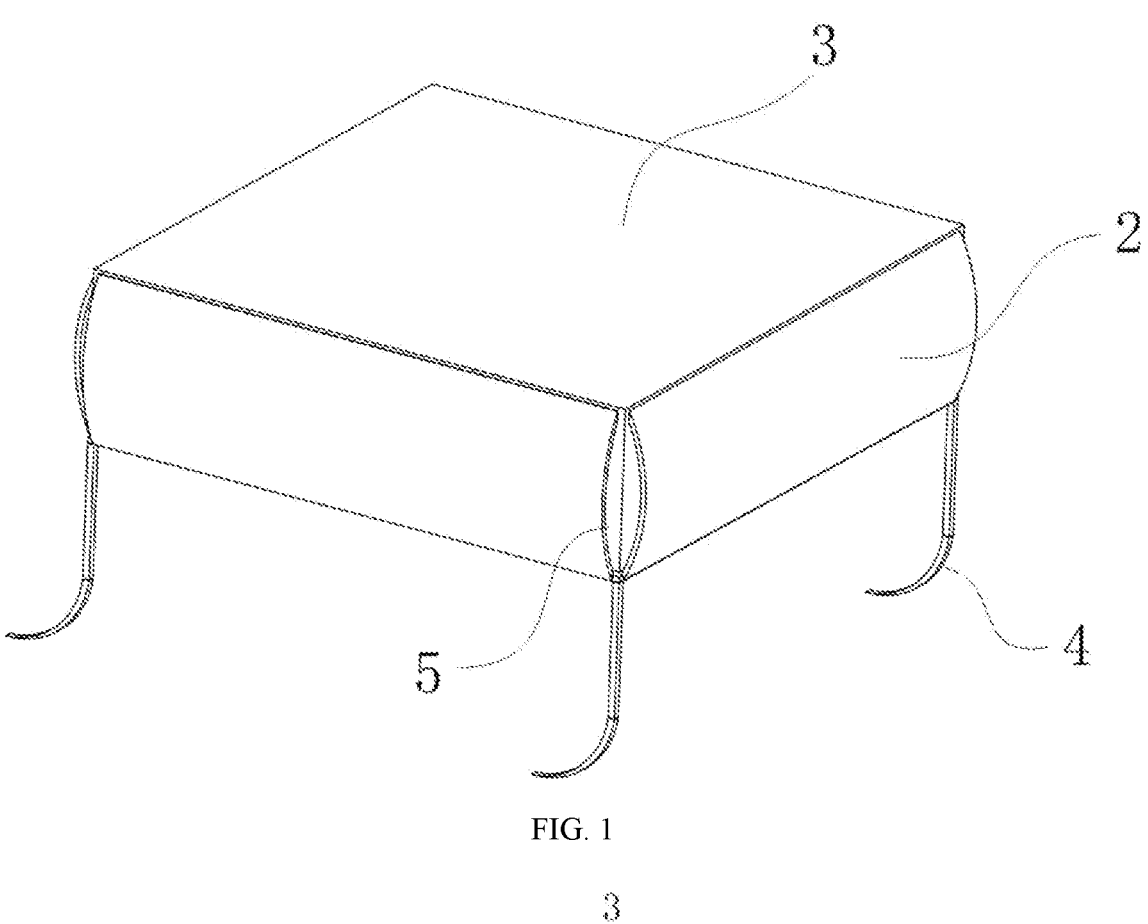
FIG. 1 is a perspective view of a frame embedded with ceramic sheets in the ceramic ablation-resistant conveyor belt provided in an embodiment of the present invention.
Figures 3, 4:
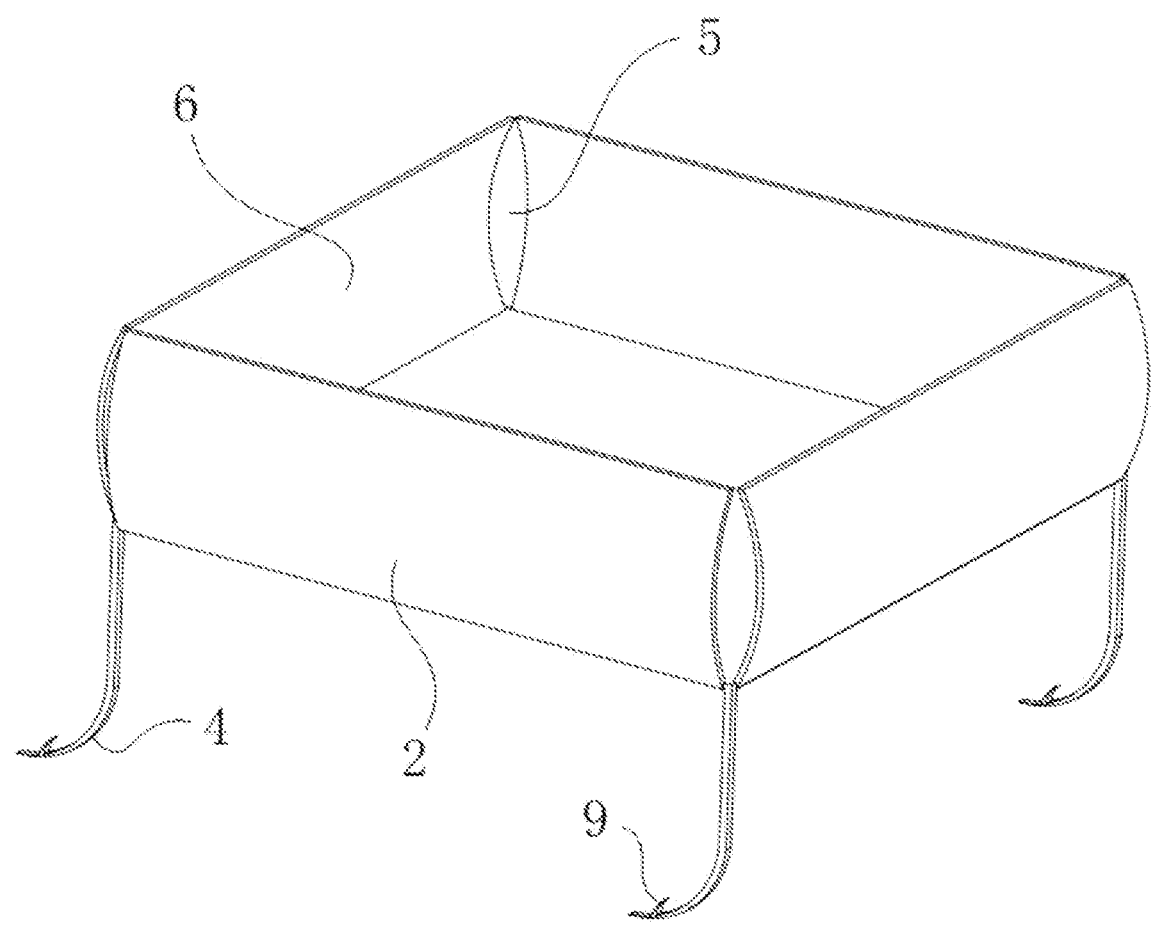
FIG. 3 is a perspective view of the frame in FIG. 2.
FIG. 4 is a perspective view of specific embodiment of the ceramic ablation-resistant conveyor belt provided in an embodiment of the present invention.

As shown in FIG. 1 and FIG. 4, a specific embodiment of the ceramic ablation-resistant conveyor belt provided in this embodiment, comprising: conveyor belt body 1, which has a core layer 8 and a vulcanized layer 7. Specifically, the core layer 8 refers to a skeleton layer formed by bonding multiple layers of canvas, and the vulcanized layer 7 refers to an elastic rubber layer that can be formed through a vulcanization process. The conveyor belt body 1 is embedded with a ceramic sheet 3, and the upper surface of the ceramic sheet 3 is exposed to the vulcanized layer 7. Specifically, the ceramic sheets 3 are embedded inside the frame 2, and the ceramic sheets 3 and the frame 2 are embedded in the vulcanized layer 7 of the conveyor belt body 1. With this arrangement, the ceramic sheets 3 are embedded in the frame 2, and the frame 2 is embedded in the vulcanized layer 7 of the conveyor belt body 1. The frame 2 is fixed through the vulcanized layer 7, and the ceramic sheets 3 are fixed through the frame 2. Compared with the ceramic sheets connected only by bonding in prior art, the ceramic sheets 3 in the ablation-resistant conveyor belt provided by the present invention are more stable, and are not prone to fall off during long-term use, even if they are dropped or damaged, they can still be replaced at any time and anywhere, so as to improve the service life of the conveyor belt.

As shown in FIG. 1 and FIG. 4, in the ceramic ablation-resistant conveyor belt provided in this embodiment, frame 2 has a hook part 4 extending downward. That is to say, the hook part 4 extends into the vulcanized layer 7. Specifically, the hook parts 4 can be integrally formed with the frame 2, or can be connected using subsequent processes, such as welding, bonding or clamping. By means of providing the hook part 4, the hook parts 4 further extend towards the vulcanized layer 7, thereby further improving the stability of the frame 2 in the vulcanized layer 7.

Figure 2:
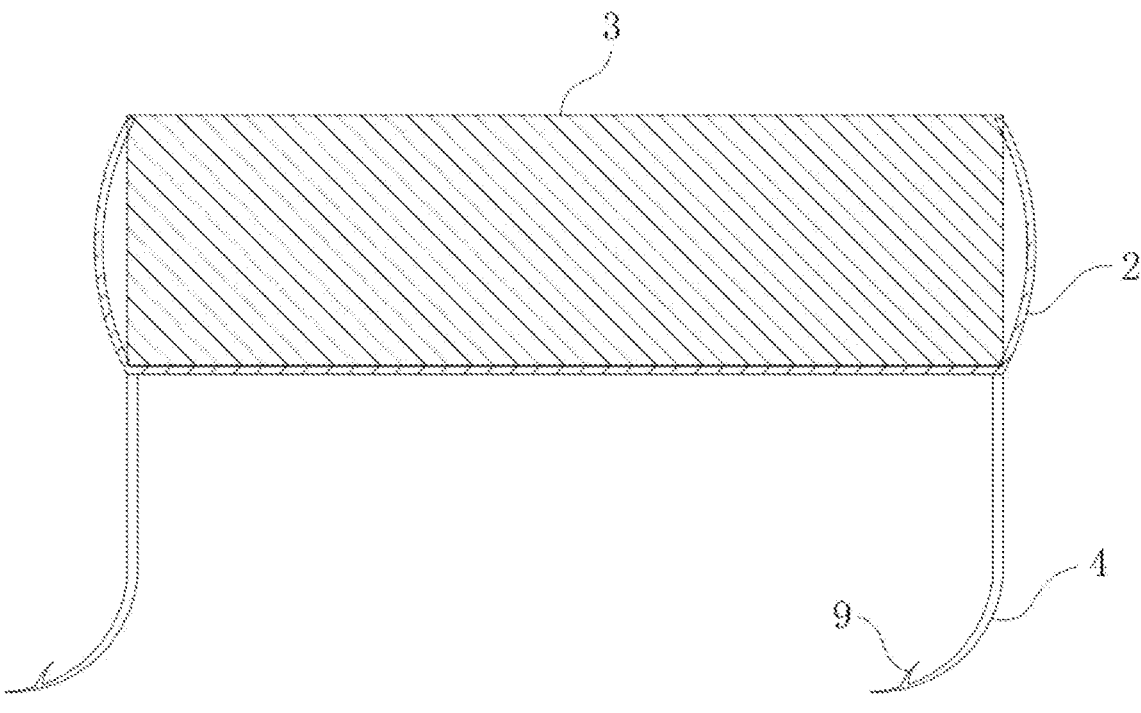
FIG. 2 is a front cross-sectional view of another specific embodiment of a frame embedded with ceramic sheets in the ceramic ablation-resistant conveyor belt provided in an embodiment of the present invention.

As shown in FIG. 2, in the ceramic ablation-resistant conveyor belt provided in this embodiment, the hook parts 4 extend downward in the vulcanized layer 7 and are inserted into the core layer 8 of the conveyor belt body 1. On the one hand, this arrangement is convenient for the positioning of the frame 2, on the other hand, when the ceramic sheets 3 are turned upward by the friction of the product to be conveyed, it can provide greater resistance, so as to ensure the stability of the connection of the ceramic sheets 3 on the conveyor belt. Definitely, the above description is not limiting, and as an alternative embodiment, the hook parts 4 do not need to be inserted into the core layer 8.

As shown in FIG. 2 and FIG. 3, in the ceramic ablation-resistant conveyor belt provided in this embodiment, the hook part 4 has a barb 9 on a portion of the hook part 4 inserted into the core layer 8. The arrangement of the barb 9 can further improve the stability of the connection of the frame 2 to the core layer 8, and improve the stability of the connection of the ceramic sheets 3 on the conveyor belt. Definitely, the above description is not limiting, and as an alternative embodiment, the barbs 9 can also be omitted.

As shown in FIG. 1 and FIG. 4, in the ceramic ablation-resistant conveyor belt provided in this embodiment, the hook part 4 has a hooking direction towards a conveying direction of the conveyor belt body 1. When the product to be conveyed is placed on the conveyor belt, the product to be conveyed is in direct contact with the ceramic sheet 3, at this time, due to the inertia of the product to be conveyed, the ceramic sheet 3 needs to bear the friction force in the direction of the product to be conveyed opposite to the conveying direction of the conveyor belt. By arranging the hook part 4 of the frame 2 toward the conveying direction of the conveyor belt body 1, can further ensure that the frame is firmly connected with the conveyor belt body, and when the products to be conveyed are placed on the conveyor belt body 1, it can better withstand the friction caused by its inertia, and ensure that the ceramic sheet 3 is firmly connected. In addition, as an alternative embodiment, the hook part 4 may be oriented not only toward the conveying direction of the conveyor belt body 1. The hook part 4 can all be arranged inwardly toward the centerline direction of the frame 2, or opposite to the above-mentioned direction and all facing outwards. Such arrangement can better withstand the multi-directional forces on the ceramic sheet 3 and can be adapted to different usage environment.

As shown in FIG. 3, in the ceramic ablation-resistant conveyor belt provided in this embodiment, there is a plurality of the hook parts 4 arranged symmetrically on the frame 2. Specifically, one hook part 4 is provided at each of the four corners of the frame 2, and the four hook parts 4 are symmetrically arranged. Such arrangement can provide a more stable hooking force to the frame 2. Definitely, these are not limiting, and only one the hook part 4 can be provided in the center, or more hook parts 4 can be provided symmetrically.

As shown in FIG. 1 and FIG. 4, in the ceramic ablation-resistant conveyor belt provided in this embodiment, the frame 2 is an elastic steel frame. In other words, the frame 2 can elastically expand and reset. In this way, when it is necessary to replace the ceramic sheet 3, only need to smash the old ceramic sheet 3 and remove it from the frame 2, and then squeeze the new ceramic sheet 3 into the frame 2 to open the frame 2, so that the new ceramic sheet 3 can be embedded into the frame 2 to complete the replacement of the new ceramic sheet 3. In addition, the frame 2 is configured as an elastic steel frame. After being embedded in the vulcanized layer 7, the stability of the ceramic sheet 3 embedded on the frame 2 can be further improved by extruding the vulcanized layer 7. Definitely, these are not limiting, in the present invention, the frame 2 can also be configured as a non-elastic structure. For example, the frame 2 can be configured as an integrally formed structure without deformation properties, or the ceramic sheet 3 can be placed inside the frame 2, the frame 2 is provided by welding or other methods, so that the frame 2 cannot be deformed elastically. This structure can also play the role of embedding and fixing the ceramic sheet 3, and the ceramic sheet 3 together with the frame 2 can also be embedded in the vulcanized layer 7 of the conveyor belt body 1. Compared with the prior art method of only bonding the ceramic sheet 3, this invention has the effect of longer service life.

It should be noted that in the ceramic ablation-resistant conveyor belt provided in this embodiment, the frame 2 is a steel frame. Since the thickness of the steel frame is thin, after the structure of the frame 2 is formed, it can have slight deformation ability, thereby facilitating the embedding of the new ceramic sheet 3 when the ceramic sheet 3 is replaced. Specifically, the steel material of the steel frame can be 45 #steel material. Definitely, this is not limiting, other types of steel materials can also be used. The use of steel not only has better heat resistance, but also provides better embedded support for the ceramic sheet 3, ensuring that the ceramic sheet 3 embedded inside are firmly connected and will not fall off easily. In addition, as an alternative embodiment, the frame 2 can also be made of other materials, such as other high-temperature resistant alloy materials.

In the ceramic ablation-resistant conveyor belt provided in this embodiment, the frame 2 is formed by mould pressing. Specifically, sheet steel can be used to form the structure of frame 2 through mould pressing. The frame 2 formed in this way does not need to be connected on the four sides, and its elastic deformation can further increase the deformation amount by expanding the four sides, thereby facilitating the embedding of a new ceramic sheet 3. In addition, as an alternative way of embodiment, the frame 2 can also be molded in other ways, for example, it can be integrally molded using an injection molding process. Although the frame 2 cannot be further expanded through the separation of the four sides, slight elastic deformation can be achieved through a thinner wall to facilitate the embedding of the ceramic sheet 3.

As shown in FIG. 1 and FIG. 3, in the ceramic ablation-resistant conveyor belt provided in this embodiment, the frame 2 has a slit 5 for rubber materials to flow into. Specifically, the slit 5 is located at the boundary of the four sides of the frame 2, and the arrangement of the slit 5 can be used for the inflow of bonding materials. Specifically, when the vulcanized layer 7 is vulcanized, part of the material enters between the frame 2 and the ceramic sheet 3 through the slit 5 of the frame 2 to fill the slit 5 between the frame 2 and the ceramic sheet 3, thereby improving the wrapping ability of the frame 2 on the ceramic sheet 3. In addition, as an alternative embodiment, the slit 5 between the frame 2 and the ceramic sheet 3 can be omitted, and glue can be directly poured between the frame 2 and the ceramic piece 3 from above to improve the wrapping ability of the frame 2 on the ceramic sheet 3; or alternatively, an elastic material, such as rubber, is provided on the inner wall of the frame 2 to improve the he wrapping ability of the ceramic sheet 3.

As shown in FIG. 2 and FIG. 3, in the ceramic ablation-resistant conveyor belt provided in this embodiment, the inner sidewall of the frame 2 is provided with a recessed structure for accommodating the ceramic sheet 3. Through this arrangement, the ceramic sheet 3 can be clamped in the frame 2, thereby improving the stability of the ceramic sheet 3 being fixed by the frame 2. Specifically, the recessed structure is the curved inner wall 6 of the frame 2. In other words, the recessed structure formed by the curved inner wall 6 of the frame 2 is used to clamp the ceramic sheet 3. Through this arrangement, the size of the frame 2 can be made slightly larger than that of the ceramic sheet 3, for example, it can be about 1.5 mm larger, that is to say, when the size of the ceramic sheet 3 is 20 mm×20 mm, the size of the frame 2 can be 21.5 mm×21.5 mm; and the heights of the frame 2 and the ceramic sheet 3 can be equal, for example, both of them can be 6 mm. Adopting the above structure, on the one hand, it is convenient to insert the ceramic sheet 3 more smoothly, on the other hand, after the curved inner wall 6 of the frame 2 is pasted with glue, it is convenient to contact the curved inner wall 6 of the frame 2 and the ceramic sheet 3, thereby improving the stability of the embedding of the ceramic piece 3. The gluing operation is carried out on the curved inner wall 6 of the frame 2, which may be formed by rubber vulcanization as described above, or may be gluing in other ways. In addition, as an alternative embodiment, the elastic layer in the frame 2 can be omitted, and the recessed structure in the frame 2 for accommodating the ceramic sheet 3 can be configured as other structures that fits the side wall of the ceramic sheet 3.

As shown in FIG. 4, in the ceramic ablation-resistant conveyor belt provided in this embodiment, the ceramic sheet 3 has a plurality of blocks provided in array on a surface of the conveyor belt body 1. Through this arrangement, it can be ensured that the products to be conveyed are preferentially contacted through the ceramic sheet 3, and the porous structure of the ceramic sheet 3 is used for heat insulation, thereby increasing the service life of the conveyor belt body 1. In addition, as an alternative embodiment, the ceramic sheets 3 may not be arranged in an array on the conveyor belt body 1. For example, they may be arranged in a haphazard manner, which is not limiting.

In addition, this embodiment also provides a method for preparing a ceramic ablation-resistant conveyor belt, comprising the following steps:

forming the core layer 8; wherein, the core layer 8 comprises a skeleton material composed of multiple layers (3 to 5 layers) of rubberized canvas;

laying a vulcanized layer 7 on the core layer 8, wherein, the vulcanized layer 7 comprises a lower cover rubber and an upper buffer layer, both of which are ablation-resistant materials;

embedding the ceramic sheet 3 inside the frame 2 and placing the embedded frame on the vulcanized layer 7; specifically, it is placed on the upper buffer layer and partially embedded into the upper buffer layer;

vulcanizing the vulcanized layer 7 by a vulcanization process, and embedding the ceramic film in the vulcanized vulcanized layer 7 together with the frame 2. In this step, the vulcanization of the vulcanized layer 7 and the embedding of the frame 2 are preformed simultaneously, that is to say, the vulcanization of the vulcanized layer 7 is used to embed the frame 2 into the conveyor belt body 1.

The method for preparing the ceramic ablation-resistant conveyor belt provided by this embodiment is to lay the vulcanized layer 7 on the core layer 8 of the belt and lay the frame 2 embedded with ceramic sheet 3 on the vulcanized layer 7 at the same time, and the frame 2 is embedded in the vulcanized layer 7 by using the vulcanization for the vulcanized layer. The above method can ensure that, the frame 2 is fixed in the vulcanized layer 7, and during use, the extrusion of the vulcanized layer 7 together with the clamping of the frame 2, can further ensure the installation stability of the ceramic sheet 3. Compared with the adhesive connection method in the prior art, the preparation method provided by this embodiment can more firmly connect the frame 2 to the conveyor belt body 1, and make the ceramic sheets 3 less likely to fall off on the conveyor belt body 1.

Obviously, the above embodiments are only for the purpose of clearly explaining the examples, not limiting the embodiments. For those ordinarily skilled in the art, other changes or variations in different forms may further be made on the basis of the above description. It is unnecessary and impossible to enumerate all the embodiments here. However, the obvious changes or variations arising therefrom are still within the scope of protection of the present disclosure.

The invention claimed is:

1. A ceramic ablation-resistant conveyor belt, comprising:
a conveyor belt body having a core layer and a vulcanized layer; and
a ceramic sheet embedded inside a frame and embedded on the vulcanized layer of the conveyor belt body together with the frame, wherein the vulcanized layer is exposed on an upper surface of the ceramic sheet, wherein:

the frame has a hook part extending downward,
the hook part extends downward in the vulcanized layer and are inserted into the core layer of the conveyor belt body,
the hook part has a barb on a portion of the hook part inserted into the core layer, and
the hook part has a hooking direction towards a conveying direction of the conveyor belt body.

2. The ceramic ablation-resistant conveyor belt of claim 1, wherein the frame is an elastic steel frame.

3. The ceramic ablation-resistant conveyor belt of claim 2, wherein the frame is formed by mould pressing.

4. The ceramic ablation-resistant conveyor belt of claim 2, wherein the frame has a slit for rubber materials to flow into.

5. The ceramic ablation-resistant conveyor belt of claim 1, wherein an inner wall of a recessed structure of the frame for accommodating the ceramic sheet is a curved inner wall.

6. The ceramic ablation-resistant conveyor belt of claim 5, wherein the frame has an elastic layer between the inner wall of the recessed structure of the frame for accommodating the ceramic sheet and the ceramic sheet.

7. The ceramic ablation-resistant conveyor belt of claim 1, wherein the ceramic sheet has a plurality of blocks provided in array on a surface of the conveyor belt body.

8. The ceramic ablation-resistant conveyor belt of claim 1, wherein the hook part has a hooking direction towards a conveying direction of the conveyor belt body.

9. The ceramic ablation-resistant conveyor belt of claim 1, wherein the hook part has a hooking direction towards a conveying direction of the conveyor belt body.

10. The ceramic ablation-resistant conveyor belt of claim 1, wherein the frame is an elastic steel frame.

11. The ceramic ablation-resistant conveyor belt of claim 1, wherein the frame is an elastic steel frame.

12. The ceramic ablation-resistant conveyor belt of claim 1, wherein the frame is an elastic steel frame.

13. The ceramic ablation-resistant conveyor belt of claim 1, wherein an inner wall of a recessed structure of the frame for accommodating the ceramic sheet is a curved inner wall.

14. The ceramic ablation-resistant conveyor belt of claim 1, wherein an inner wall of a recessed structure of the frame for accommodating the ceramic sheet is a curved inner wall.

15. The ceramic ablation-resistant conveyor belt of claim 1, wherein an inner wall of a recessed structure of the frame for accommodating the ceramic sheet is a curved inner wall.

16. A method for preparing the ceramic ablation-resistant conveyor belt of claim 1, wherein the method comprises the following steps:
forming the core layer,
laying the vulcanized layer on the core layer,
embedding the ceramic sheet inside the frame and placing the embedded frame on the vulcanized layer,
vulcanizing the vulcanized layer by a vulcanization process, and
embedding a ceramic film in the vulcanized layer together with the frame.

\* \* \* \* \*